(12) United States Patent
Smith et al.

(10) Patent No.: US 9,009,375 B2
(45) Date of Patent: Apr. 14, 2015

(54) SHARING OF BYPASSED I/O TRANSACTION INFORMATION

(71) Applicant: LSI Corporation, San Jose, CA (US)

(72) Inventors: Gerald E. Smith, Longmont, CO (US); James A. Rizzo, Austin, TX (US); Robert L. Sheffield, Longmont, CO (US); Anant Baderdinni, Norcross, GA (US)

(73) Assignee: LSI Corporation, Milpitas, CA (US)

( * ) Notice: Subject to any disclaimer, the term of this patent is extended or adjusted under 35 U.S.C. 154(b) by 36 days.

(21) Appl. No.: 13/927,343

(22) Filed: Jun. 26, 2013

(65) Prior Publication Data

US 2014/0365692 A1 Dec. 11, 2014

Related U.S. Application Data

(60) Provisional application No. 61/833,551, filed on Jun. 11, 2013.

(51) Int. Cl.
*G06F 13/12* (2006.01)
*G06F 13/38* (2006.01)
*G06F 3/06* (2006.01)

(52) U.S. Cl.
CPC .............. *G06F 3/0655* (2013.01); *G06F 3/061* (2013.01); *G06F 3/0683* (2013.01)

(58) Field of Classification Search
USPC ................................. 710/38, 52, 74
See application file for complete search history.

(56) References Cited

U.S. PATENT DOCUMENTS

| | | | |
|---|---|---|---|
| 6,633,962 B1 * | 10/2003 | Burton et al. ................. | 711/163 |
| 6,754,853 B1 * | 6/2004 | DeKoning et al. .............. | 714/42 |
| 6,986,015 B2 | 1/2006 | Testardi | |
| 8,370,447 B2 | 2/2013 | Benner et al. | |
| 8,412,904 B2 | 4/2013 | Flynn et al. | |
| 8,433,882 B2 | 4/2013 | Kurashige et al. | |
| 2007/0067497 A1 * | 3/2007 | Craft et al. .................... | 709/250 |
| 2011/0238913 A1 * | 9/2011 | Kurashige et al. ............ | 711/114 |
| 2013/0054871 A1 * | 2/2013 | Lassa ............................ | 711/103 |

\* cited by examiner

*Primary Examiner* — Farley Abad
(74) *Attorney, Agent, or Firm* — Duft Bornsen & Fettig LLP

(57) ABSTRACT

A first I/O transaction request is sent to a storage controller for processing by firmware running on the storage controller. A second I/O transaction request is sent to storage hardware without further processing by the firmware running on the storage controller. Since the firmware did not process the second I/O transaction request, information associated with the second I/O transaction is stored in in a circular buffer accessible to the firmware running on the storage controller. The firmware running on the storage controller reads, from the circular buffer, the information associated with the second I/O transaction that was stored in the circular buffer.

18 Claims, 4 Drawing Sheets

SHARING OF BYPASSED I/O TRANSACTION INFORMATION

BACKGROUND OF THE INVENTION

All or most of the components of a computer or other electronic system may be integrated into a single integrated circuit (chip). The chip may contain various combinations of digital, analog, mixed-signal, and radio-frequency functions. These integrated circuits may be referred to as a system-on-a-chip (SoC or SOC). A typical application is in the area of embedded systems. A variant of a system on a chip is the integration of many RAID functions on a single chip. This may be referred to as RAID on a chip (ROC).

RAID arrays may be configured in ways that provide redundancy and error recovery without any loss of data. RAID arrays may also be configured to increase read and write performance by allowing data to be read or written simultaneously to multiple disk drives. RAID arrays may also be configured to allow "hot-swapping" which allows a failed disk to be replaced without interrupting the storage services of the array. The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of operating a storage system, comprising: sending a first I/O transaction request to a storage controller for processing by firmware running on the storage controller; sending a second I/O transaction request to storage hardware without further processing by the firmware running on the storage controller; and, storing information associated with the second I/O transaction in a circular buffer.

An embodiment of the invention may therefore further comprise a storage system, comprising: a storage controller configured with a circular buffer to receive information associated with I/O transactions that are not sent to be processed by storage controller firmware; and, a host system running a storage driver configured to send a first plurality of I/O transactions directly to storage hardware without sending the first plurality of I/O transactions to be processed by storage controller firmware. The storage driver also configured to send a second plurality of I/O transactions to the storage controller for processing by the storage controller firmware. The storage driver also configured to send information associated with the first plurality of I/O transactions to the circular buffer.

DETAILED DESCRIPTION OF THE EMBODIMENTS

Figure 1:
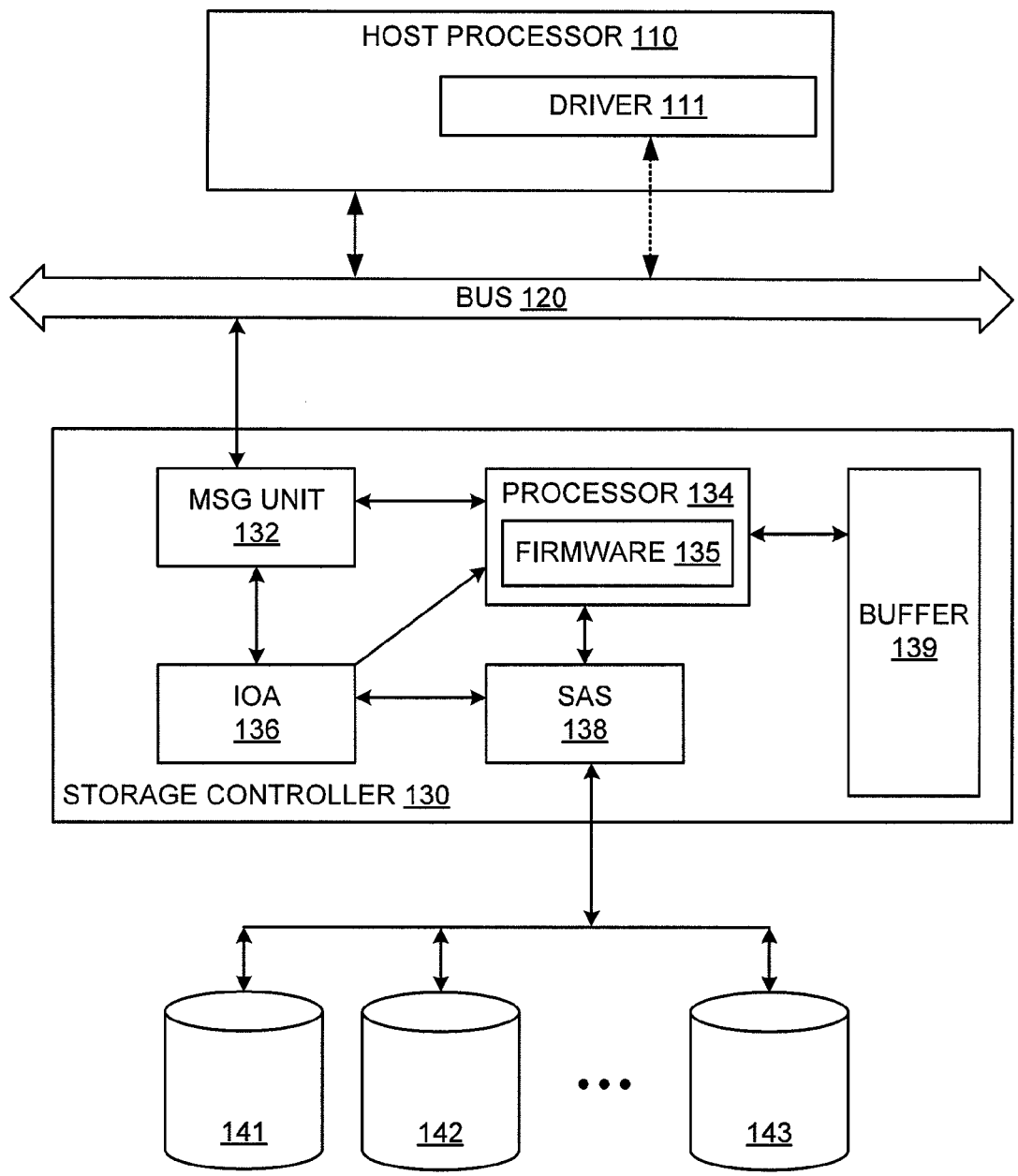
FIG. 1 is a block diagram illustrating a storage system.

FIG. 1 is a block diagram illustrating a storage system. In FIG. 1, storage system 100 comprises host processor 110, bus 120, storage controller 130, and storage devices 141-143. Host processor 110 includes driver 111. Storage controller 130 includes message unit 132, processor 134, I/O accelerator (IOA) 136, serial attached SCSI (SAS) interface 138, and circular buffer 139. Processor 134 includes firmware 135.

Host processor 110 is operatively coupled to bus 120. Bus 120 may be, for example, a PCIe bus. Bus 120 is operatively coupled to storage controller 130. Storage controller 130 may be, or include, a RAID controller. Message unit 132 is operatively coupled to processor 134 and I/O accelerator 136. I/O accelerator 136 is operatively coupled to SAS interface 138 and processor 134. Processor 134 is operatively coupled to SAS interface 138. SAS interface 138 is operatively coupled to storage devices 141-143. Storage devices 141-143 may be, for example, physical disk drives, solid-state disk drives, or a combination thereof. Circular buffer 139 can be established in storage controller 130 memory space. Circular buffer 139 can be accessible to driver 111 using bus 120 address space.

Host processor runs (executes) driver 111. Processor 134 runs firmware 135. Driver 111 and firmware 135 may cooperate to provide storage and/or RAID functionality to host processor 110. For example, host processor 110 may access one or more of storage devices 141-143 via storage controller 130 using driver 111. Storage devices 141-143 may be configured by storage controller 130 by running firmware 135. Storage controller 130 may operate one or more of storage devices 141-143 as a RAID array. Storage controller 130 may operate one or more of storage devices 141-143 to appear to host process 100 as one or more virtual volumes (a.k.a., virtual disks).

In an embodiment, storage controller 130 can support multiple paths for I/O transactions to proceed to/from host processor 110 to/from storage devices 141-143. Some of these paths may have higher performance than others. For example, message unit 132 may be configured to receive an I/O transaction request from host processor 110 via bus 120. Message unit 132 may process this I/O transaction request and then pass the I/O transaction request to processor 134 for further processing. This further processing may be controlled and/or instructed by firmware 135. This further processing may be or include processing to implement a RAID level on storage devices 141-143. This further processing may be or include processing to implement caching of data stored on one or more of storage devices 141-143. Caching strategies that may be implemented are, for example, writeback, write-through, etc. RAID levels that may be implemented include, for example, RAID levels 0-6 (and combinations thereof), etc.

In an embodiment, message unit 132 may be configured to receive I/O transaction requests from host processor 110 via bus 120 and pass these I/O requests to I/O accelerator 136 and then on to SAS interface 138 for passing to storage devices 141-143 without further processing by processor 134 and/or firmware 135. Message unit 132 and/or I/O accelerator 136 may be configured by driver 111 to pass I/O transaction requests directly to storage devices 141-143 without further processing by processor 134 and/or firmware 135. Sending I/O transactions directly to storage devices 141-143 without processing by processor 134 provides a high performance I/O transaction path from host 110 to storage devices 141-143.

Figure 2:
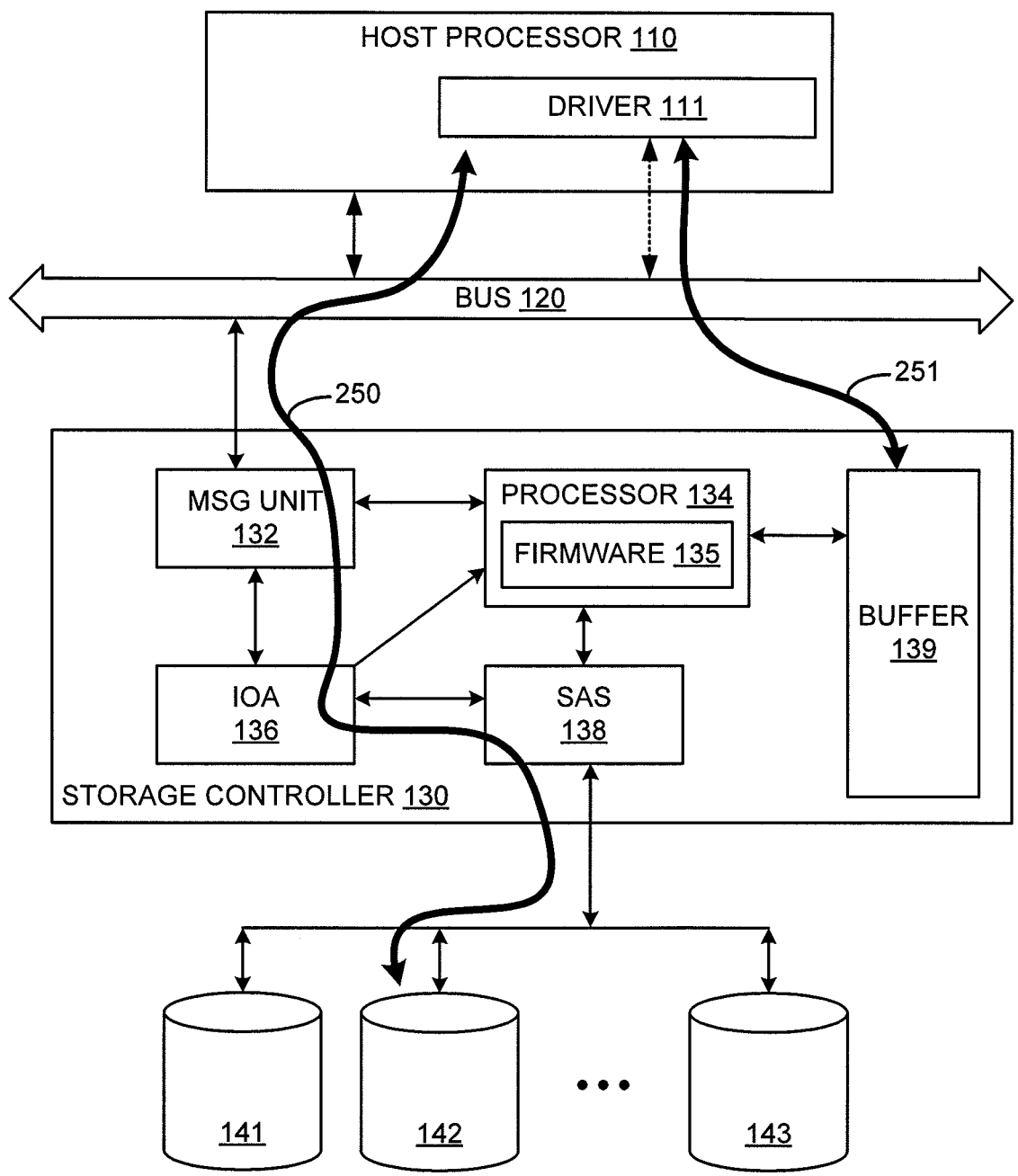
FIG. 2 is an illustration of an I/O path.

Arrow 250 in FIG. 2 illustrates a high performance I/O transaction path that does not involve further processing of an I/O transaction request by processor 134 and/or firmware 135. In an embodiment, driver 111 can store, in circular buffer 139, information about I/O transactions that are sent directly to storage devices 141-143. This is illustrated in FIG. 2 by arrow 251. Driver 111 can continuously store information in buffer 139 about I/O transactions that have been sent directly to storage devices 141-143. Optionally, driver 111 may also continuously store information in buffer 139 about I/O transactions that have not been sent directly to storage devices 141-143. Information that driver 111 may store include logical unit number (LUN), LBA, count, and operation performed (e.g., read or write). Driver 111 may place information in buffer 139 without acknowledgement that firmware 134 has or will, use the information in buffer 139. Driver 111 may place information in circular buffer 139 that overwrites information previously stored in buffer 139.

In an embodiment, IOA 136 can store, in circular buffer 139, information about I/O transactions that are sent directly to storage devices 141-143. IOA 136 can continuously store information in buffer 139 about I/O transactions that have been sent directly to storage devices 141-143. Optionally, IOA 136 may also continuously store information in buffer 139 about I/O transactions that have not been sent directly to storage devices 141-143. Information that IOA 136 may store include logical unit number (LUN), LBA, count, and operation performed (e.g., read or write). IOA 136 may place information in buffer 139 without acknowledgement that firmware 134 has or will, use the information in buffer 139. IOA 136 may place information in circular buffer 139 that overwrites information previously stored in buffer 139.

Firmware 135 running on processor 134 can read the information in circular buffer 139. Firmware 135 can use the information in circular buffer 139 to, for example, determine if certain storage locations should be pre-emptively cached.

In an embodiment, storage controller 130 is configured with circular buffer 139 to receive information associated with I/O transactions that are not sent to processor 134 and/or firmware 135. Host processor 110 runs a storage driver 111 which is configured to send at least some I/O transactions directly to storage hardware 141-143 without sending these I/O transactions to be processed by storage controller firmware 135. The storage driver 111 is also configured to send information associated with these I/O transactions that are not processed by firmware 135 to the circular buffer 139. The storage driver is also configured to send other I/O transactions, which are to be processed by firmware 135, to be processed by storage controller firmware 135.

Storage controller 130 can be configured to read the information associated with I/O transactions from the circular buffer 139. The information associated with I/O transactions that are processed by firmware 135 may not be sent to the circular buffer 139. The information associated with I/O transactions that is stored in circular buffer 139 can include a logical unit number (LUN) associated with each I/O transaction. The information associated with I/O transactions that is stored in circular buffer 139 can include a logical block address (LBA) associated with each I/O transaction. The information associated with I/O transactions that is stored in circular buffer 139 can include an indicator of an operation associated with each I/O transaction.

Figure 3:
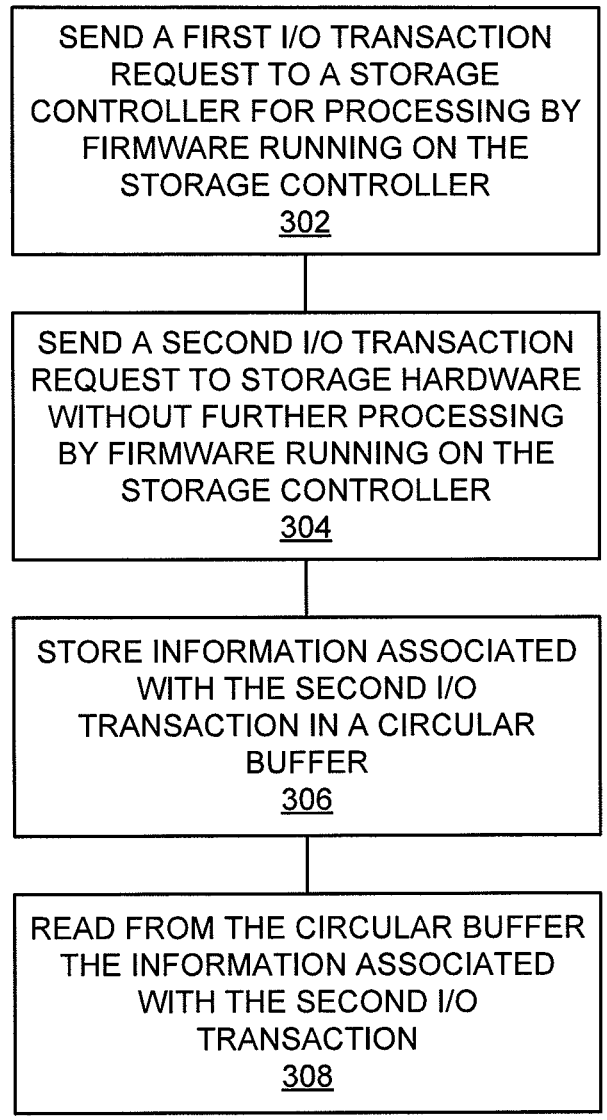
FIG. 3 is a flowchart illustrating a method of operating a storage system.

FIG. 3 is a flowchart illustrating a method of operating a storage system. The steps illustrated in FIG. 3 may be performed by one or more elements of storage system 100. A first I/O transaction request is sent to a storage controller for processing by firmware running on the storage controller (302). For example, driver 111 may send an I/O transaction request to storage controller 130 for processing by firmware 135 running on processor 134. A second I/O transaction request is sent to storage hardware without further processing by firmware running on the storage controller (304). For example, driver 111 may send an I/O request to storage controller 130 to be passed directly to storage device 141-143, via IOA 136, without further processing by firmware 135.

Information associated with the second I/O transaction is stored in a circular buffer (306). For example, information associated with the second I/O transaction can be stored by driver 111 in circular buffer 139. In another example, IOA 136 can store information associated with the second I/O transaction in circular buffer 139. The information stored in circular buffer 139 can include virtual disk index, LUN, LBA, operation, etc.

The information associated with the second I/O transaction is read from the circular buffer (308). For example, processor 134 and/or firmware 135 may read information from circular buffer 139. This information may be used by firmware 135 for statistical and/or informational purposes. In an embodiment, driver 111 may overwrite data stored in buffer 139. However, if this information is used for only statistical and/or informational purposes, this overwriting will not cause functional or data integrity problems with the data processed by storage controller 130 and/or stored on storage devices 141-143.

The methods, systems, networks, devices, equipment, and functions described above may be implemented with or executed by one or more computer systems. The methods described above may also be stored on a computer readable medium. Elements of storage system 100, may be, comprise, include, or be included in, computers systems. This includes, but is not limited to host processor 110, processor 134, and storage devices 141-143.

Figure 4:
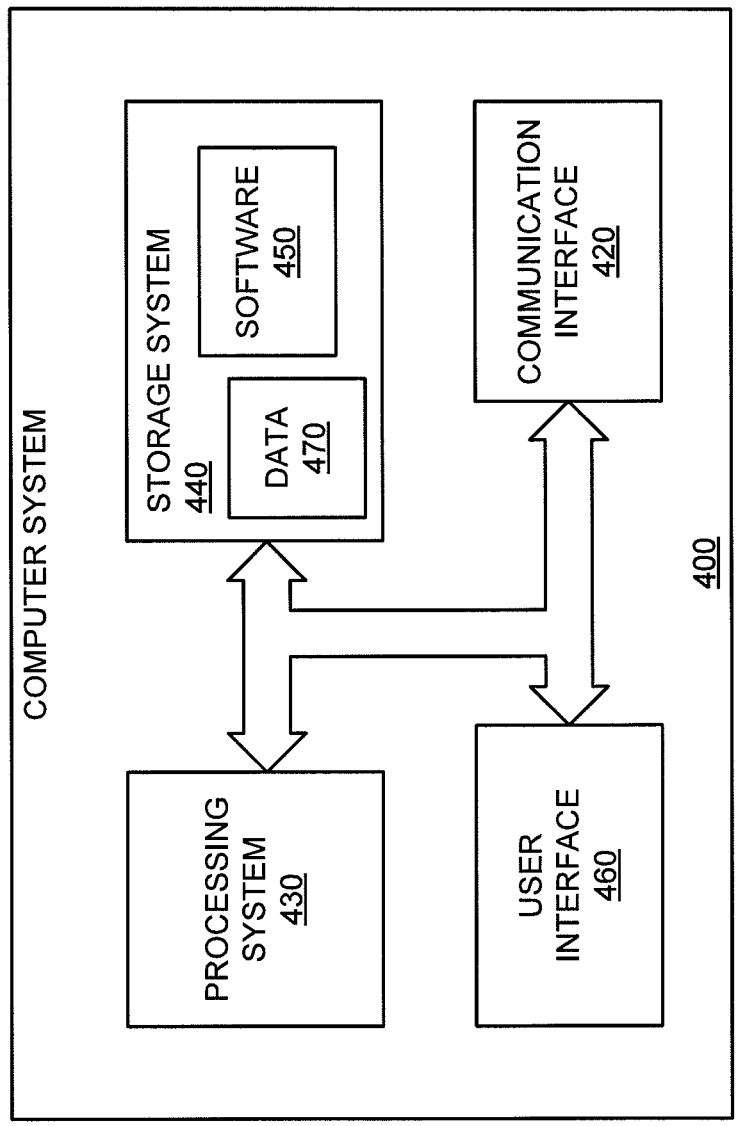
FIG. 4 is a block diagram of a computer system.

FIG. 4 illustrates a block diagram of a computer system. Computer system 400 includes communication interface 420, processing system 430, storage system 440, and user interface 460. Processing system 430 is operatively coupled to storage system 440. Storage system 440 stores software 450 and data 470. Processing system 430 is operatively coupled to communication interface 420 and user interface 460. Computer system 400 may comprise a programmed general-purpose computer. Computer system 400 may include a microprocessor. Computer system 400 may comprise programmable or special purpose circuitry. Computer system 400 may be distributed among multiple devices, processors, storage, and/or interfaces that together comprise elements 420-470.

Communication interface 420 may comprise a network interface, modem, port, bus, link, transceiver, or other communication device. Communication interface 420 may be distributed among multiple communication devices. Processing system 430 may comprise a microprocessor, microcontroller, logic circuit, or other processing device. Processing system 430 may be distributed among multiple processing devices. User interface 460 may comprise a keyboard, mouse, voice recognition interface, microphone and speakers, graphical display, touch screen, or other type of user interface device. User interface 460 may be distributed among multiple interface devices. Storage system 440 may comprise a disk, tape, integrated circuit, RAM, ROM, network storage, server, or other memory function. Storage system 440 may be a computer readable medium. Storage system 440 may be distributed among multiple memory devices.

Processing system 430 retrieves and executes software 450 from storage system 440. Processing system 430 may retrieve and store data 470. Processing system 430 may also retrieve and store data via communication interface 420. Processing system 430 may create or modify software 450 or data 470 to achieve a tangible result. Processing system 430 may control communication interface 420 or user interface 460 to achieve a tangible result. Processing system 430 may retrieve and execute remotely stored software via communication interface 420.

Software 450 and remotely stored software may comprise an operating system, utilities, drivers, networking software, and other software typically executed by a computer system. Software 450 may comprise an application program, applet, firmware, or other form of machine-readable processing instructions typically executed by a computer system. When executed by processing system 430, software 450 or remotely stored software may direct computer system 400 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A storage controller operable to process Input/Output (I/O) requests from a host system to a plurality of storage devices, the storage controller comprising: a logically circular buffer; an I/O processor communicatively coupled to the logically circular buffer; and a firmware module that, when directed by the I/O processor, is operable to process a first set of the I/O requests from the host system to the storage devices through a protocol of the storage controller,
wherein the I/O processor is operable to process a second set of the I/O requests from the host system to the storage devices outside of the protocol of the storage controller and to cache information about the second set of I/O requests in the logically circular buffer for subsequent access by the host system, and
wherein the logically circular buffer is operable to overwrite cached information based on a size of the logically circular buffer to ensure that the cached information is refreshed.

2. The storage controller of claim 1, wherein:
the protocol of the storage controller includes a Redundant Array of Independent Disks (RAID) implementation for one or more of the storage devices.

3. The storage controller of claim 1, wherein:
the protocol of the storage controller includes a Serial Attached Small Computer Systems Interface (SAS) protocol stack.

4. The storage controller of claim 1, wherein:
the information about the second set of I/O requests includes a logical block address, a logical unit number, a type of I/O operation performed, or a combination thereof, for each of the second set of I/O requests.

5. The storage controller of claim 1, wherein:
a first of the second set of I/O requests is a read I/O request to one or more of the storage devices; and
the I/O processor is further operable to read data from the one or more storage devices and to cache the data in the logically circular buffer for subsequent access by the host system.

6. The storage controller claim 1, wherein:
the I/O processor is further operable to cache information about the second set of I/O requests in one or more of the storage devices.

7. A method of processing Input/Output (I/O) requests from a host system to a plurality of storage devices through a storage controller, the method comprising:
processing a first set of the I/O requests from the host system to the storage devices through a protocol of the storage controller;
processing a second set of the I/O requests from the host system to the storage devices outside of the protocol of the storage controller;
caching information about the second set of I/O requests in a logically circular buffer for subsequent access by the host system; and
overwriting cached information based on a size of the logically circular buffer to ensure that the cached information is refreshed.

8. The method of claim 7, wherein:
the protocol of the storage controller includes a Redundant Array of Independent Disks (RAID) implementation for one or more of the storage devices.

9. The method of claim 7, wherein:
the protocol of the storage controller includes a Serial Attached Small Computer Systems Interface (SAS) protocol stack.

10. The method of claim 7, wherein: the information about the second set of I/O requests includes a logical block address, a logical unit number, a type of I/O operation performed, or a combination thereof, for each of the second set of I/O requests.

11. The method of claim 7, further comprising:
processing a first of the second set of I/O requests as a read I/O request to one or more of the storage devices;
reading data from the one or more storage devices; and
caching the data in the logically circular buffer for subsequent access by the host system.

12. The method of claim 7, further comprising:
caching information about the second set of I/O requests in one or more of the storage devices.

13. A non-transitory computer readable medium comprising instructions that, when directed by an Input/Output (I/O) processor of a storage controller, directs the I/O processor to process I/O requests from a host system to a plurality of storage devices, the instructions further directing the I/O processor to:
process a first set of the I/O requests from the host system to the storage devices through a protocol of the storage controller;
process a second set of the I/O requests from the host system to the storage devices outside of the protocol of the storage controller;
cache information about the second set of I/O requests in a logically circular buffer for subsequent access by the host system; and
overwrite cached information based on a size of the logically circular buffer to ensure that the cached information is refreshed.

14. The computer readable medium of claim 13, wherein:
the protocol of the storage controller includes a Redundant Array of Independent Disks (RAID) implementation for one or more of the storage devices.

15. The computer readable medium of claim 13, wherein:
the protocol of the storage controller includes a Serial Attached Small Computer Systems Interface (SAS) protocol stack.

16. The computer readable medium of claim 13, wherein: the information about the second set of I/O requests includes a logical block address, a logical unit number, a type of I/O operation performed, or a combination thereof, for each of the second set of I/O requests.

17. The computer readable medium of claim 13, further comprising instructions that direct the I/O processor to:
- process a first of the second set of I/O requests as a read I/O request to one or more of the storage devices;
- read data from the one or more storage devices; and
- cache the data in the logically circular buffer for subsequent access by the host system.

18. The computer readable medium of claim 13, further comprising instructions that direct the I/O processor to:
- cache information about the second set of I/O requests in one or more of the storage devices.

* * * * *